United States Patent [19]
Shimai et al.

[11] Patent Number: 5,762,841
[45] Date of Patent: Jun. 9, 1998

[54] CERAMIC POROUS BODY HAVING A CONTINUOUS PARTICLE SIZE DISTRIBUTION

[75] Inventors: Shunzo Shimai; Koichi Imura; Kenichi Okamoto; Koichi Shiraishi; Kuniko Ando, all of Tokyo, Japan

[73] Assignee: Toshiba Ceramics Co., Ltd., Tokyo, Japan

[21] Appl. No.: 604,623

[22] Filed: Feb. 21, 1996

Related U.S. Application Data

[62] Division of Ser. No. 355,324, Dec. 12, 1994, abandoned, which is a continuation of Ser. No. 98,900, Jul. 29, 1993, abandoned.

[51] Int. Cl.$^6$ .................... C04B 38/00; C04B 38/06
[52] U.S. Cl. .................... 264/44; 264/86; 264/628; 264/637; 264/651
[58] Field of Search ................ 264/44, 66, 86, 264/637, 651, 628

[56] References Cited

U.S. PATENT DOCUMENTS

| | | | |
|---|---|---|---|
| 3,052,949 | 9/1962 | Williams | 264/86 |
| 4,268,466 | 5/1981 | Ezis | 264/86 |
| 4,629,483 | 12/1986 | Stanton | 55/487 |
| 4,810,273 | 3/1989 | Komoda | 55/487 |

*Primary Examiner*—James Derrington
*Attorney, Agent, or Firm*—Finnegan, Henderson, Farabow, Garrett & Dunner, L.L.P.

[57] ABSTRACT

A ceramic porous body is constituted of ceramic particles which have a substantially continuous, monotonic size distribution in the thickness direction of the porous body.

4 Claims, 3 Drawing Sheets

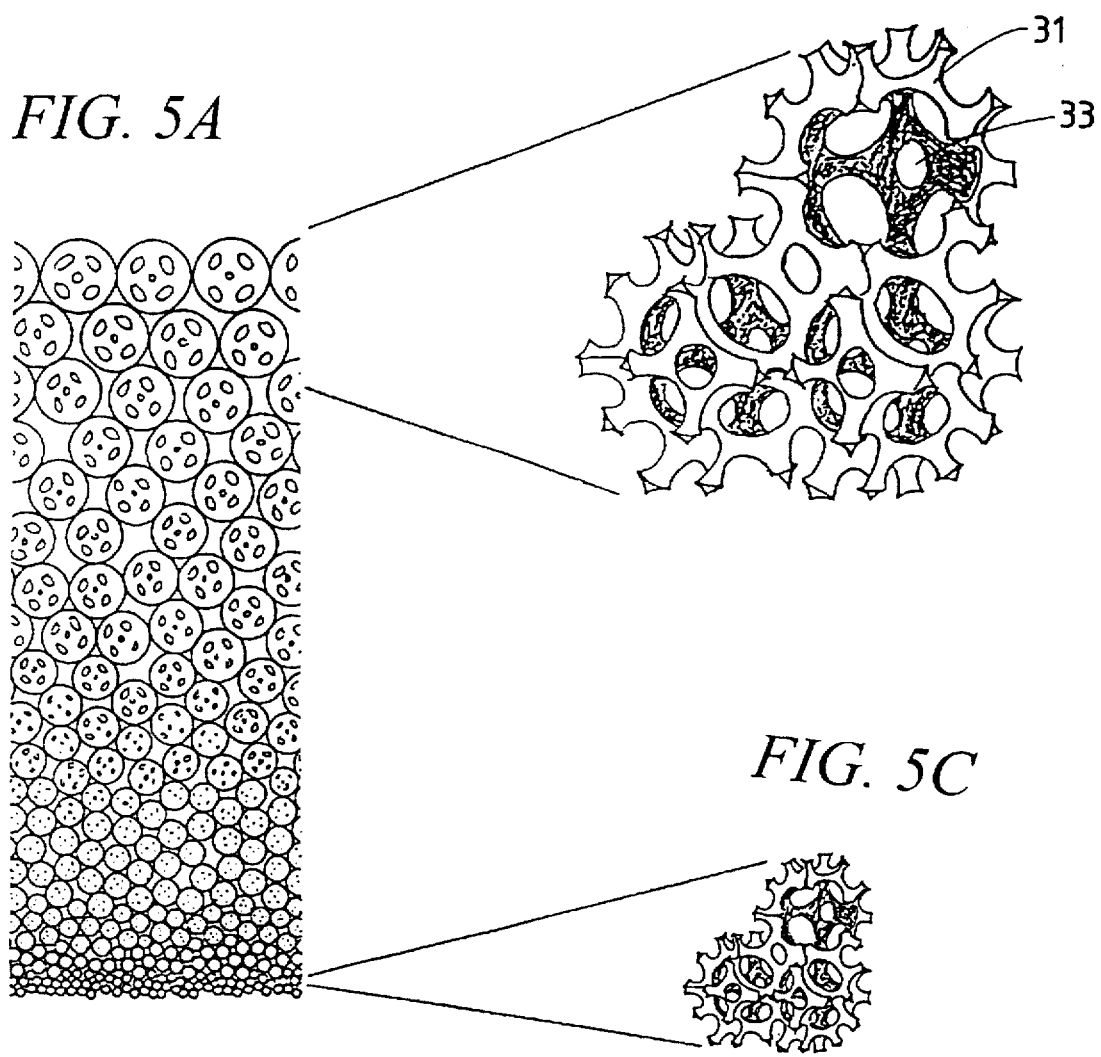

CERAMIC POROUS BODY HAVING A CONTINUOUS PARTICLE SIZE DISTRIBUTION

This is a division of application Ser. No. 08/355,324, filed Dec. 12, 1994, now abandoned, which is a continuation of application Ser. No. 08/098,900, filed Jul. 29, 1993, now abandoned.

BACKGROUND OF THE INVENTION

The present invention relates to a ceramic porous body having a graded pore size (in other words, particle size) distribution.

As is well known, ceramic porous bodies are used in various fields, for example, as a ceramic filter utilizing connected pores and as a heat insulator making use of a pore-containing structure.

In order to reduce the permeation resistance, ceramic membranes of, for instance, ceramic filters, having what is called an asymmetric structure, are widely used to provide superior performance. The asymmetric structure is needed to make the portion having smaller pores as thin as possible which tends to exhibit a high permeation resistance. In general, the ceramic membrane having an asymmetric multilayer structure is produced such that a first layer having smaller pores is formed on a support member having larger pores, and then a second layer having further smaller pores is formed thereon. The membrane is asymmetric along its thickness direction.

On the other hand, ceramic heat insulators include ones made by shaping ceramic fibers and heat-insulating bricks in which pores are introduced by foaming. However, there has not been proposed a type in which a single product has a varying pore size distribution.

The conventional ceramic porous bodies having the asymmetric structure, which are produced by sequentially forming a support member, an intermediate layer and a membrane, have problems of a complicated manufacturing process and high costs.

In making the asymmetric ceramic membrane, some means is needed to insure that ceramic particles for a layer to be formed on the support member will not enter the support member, because the ceramic particles for that layer are smaller than the pores of the support member, which is another cause of making the ceramic asymmetric membrane expensive.

On the other hand, it is concluded in view of the heat transfer theory that the heat insulators made of a ceramic porous body exhibit insufficient performance. Since the heat transfer mechanism varies with the temperature (at high temperatures the transfer by radiation increases), it is desired that the heat insulator have a structure which can provide a minimum heat conductivity in accordance with a temperature distribution therein. However, the existing heat insulators do not have such a structure within a single heat insulator, and do not achieve sufficient heat insulation actually.

SUMMARY OF THE INVENTION

The present invention has been made in view of the above circumstances, and has an object of providing a ceramic porous body which can easily be varied in chemical composition and in porous structure in accordance with its use, and which can be manufactured at low cost.

According to the invention, a ceramic porous body is essentially constituted of ceramic particles having a substantially continuous, monotonic size distribution in a thickness direction of the ceramic porous body.

A method of producing the above ceramic porous body comprises the steps of:

preparing a ceramic slurry by suspending ceramic particles having a predetermined size distribution in a first liquid;

introducing the ceramic slurry into a second liquid;

causing the ceramic particles to move by centrifugal force or gravity in its direction to thereby form, onto a wall surface or bottom surface of a container of the second liquid, a shaped body of the ceramic particles having a size distribution in which a ceramic particle size increases toward the movement direction.;

drying the shaped body; and firing the dried shaped body.

According to another aspect of the invention, a ceramic porous body is essentially constituted of ceramic particles and comprises struts made of sintered ceramics and cells defined by hollow spaces enclosed by the struts, the cells having a substantially continuous, monotonic size distribution in a thickness direction of the ceramic porous body.

A method of producing the above ceramic porous body comprises the steps of:

preparing a first ceramic slurry by suspending, in a first liquid, first ceramic particles having a predetermined size distribution and made of a material removable by oxidation;

introducing the first ceramic slurry into a second liquid;

causing the first ceramic particles to move by centrifugal force or gravity in its direction to thereby form, onto a wall or a bottom surface of a container of the second liquid, a shaped body of the first ceramic particles having a size distribution in which a ceramic particle size increases toward the movement direction;

drying the shaped body; and firing the dried shaped body in a non-oxidizing atmosphere;

preparing a second slurry including second ceramic particles having an average size smaller than a minimum size of the first ceramic particles;

impregnating the second slurry into the fired shaped body;

removing the first ceramic particles as a gas by oxidizing those in an oxidizing atmosphere; and firing a porous body obtained by the removing step.

Another method of producing the above ceramic porous body comprises the steps of:

preparing a slurry by suspending ceramic particles having a predetermined size distribution in a liquid;

agitating the slurry to foam;

drying the foamed slurry while making the foamed slurry in contact with a water absorbing member so that a bubble size increases from a contact surface to the other surface; and firing a dried shaped body.

BRIEF DESCRIPTION OF THE DRAWINGS

FIG. 5 includes a sectional view taken along the thickness direction of a porous body according to example 3, and partially enlarged views thereof.

DESCRIPTION OF THE PREFERRED EMBODIMENTS

Figure 1:
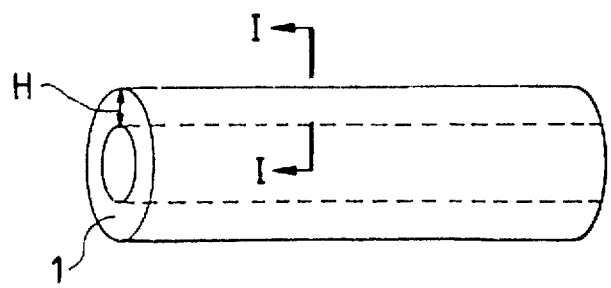
FIG. 1 shows a perspective view of a tubular alumina porous body according to example 1 of the present invention.

As is summarized above, the ceramic porous body according to the present invention is characterized by the feature that the pore size (or particle size) distribution in the thickness direction is substantially continuous and monotonic, and can be manufactured by various methods.

For example, a ceramic filter (plate-like ceramic porous body) having fine pore sizes distributed in the material thickness direction is produced by the following steps (1)–(3). The fine pores in a filter are created as interstices between ceramic particles. By packing ceramic particles of different sizes to provide a size distribution having a gradient and then sintering those, a ceramic filter having connected pores of the above size distribution can be produced.

(1) First, ceramic particles having a size distribution are dispersed in water to prepare a slurry. (2) Then, the slurry is poured gently into water of a predetermined depth. The ceramic particles in the poured slurry settle at different speeds depending on their sizes; that is, larger particles settle faster. Therefore, a resultant settled layer will have a gradient in the particle size profile. (3) Then, the settled layer is dried to produce a shaped body whose pore size distribution has a gradient. This method can prevent the phenomenon that smaller particles are introduced into interstices (pores) between larger particles and the pore sizes are thereby reduced.

A tubular asymmetric ceramic membrane can be formed by utilizing the principle that the settling speed of particles in water is proportional to their sizes. For example, it is formed by the following steps (1)–(3). (1) First, a gypsum mold having a cylindrical space is filled with water. (2) Then, a thin pipe charged with a ceramic slurry is inserted into the central portion of the water column and a stopper is removed, whereby the slurry is introduced into the central portion of the water column. (3) Subsequently, the gypsum mold is rotated, whereby ceramic particles in the slurry are moved toward the gypsum mold by centrifugal force and deposited thereon. (4) After the formation of the settled layer, the water is drained from the mold, followed by drying. Then, a tubular shaped body is removed from the gypsum mold, and sintered to become an asymmetric ceramic membrane. This method can prevent the phenomenon that smaller particles are introduced into interstices (pores) between larger particles and the pore sizes are thereby reduced.

Ceramic porous bodies for use as a heat insulator, etc. can be produced by various methods such as foaming and burning off inflammables. The pore size distribution having a gradient can be obtained in each method.

In the case of the foaming method, a ceramic porous body having such a pore size distribution is produced by the following steps (1)–(3). (1) First, a ceramic powder is mixed with a dispersant such as water to form a slurry, which is then mixed with a foaming agent, a binder, etc. The mixture is agitated and/or heated, or otherwise treated to decompose the foaming agent, whereby a gas is generated to foam the slurry. (2) Then, the foam is dried, i.e., freed of moisture to solidify. Since the foam has a large surface area, bubbles tend to coalesce to become larger before the foam solidifies.

To avoid this phenomenon, the foam is placed on a water-absorbing material such as a gypsum board, whereby the water in the portion of the foam that is in contact with the gypsum plate is absorbed thereby, so that in that portion the foam solidification proceeds before the bubble coalescence. The bubble coalescence proceeds faster when more moisture is included. In the portion of the foam close to the gypsum plate, the moisture in the bubbles is absorbed by the gypsum plate relatively faster and the bubble size is maintained small. On the other hand, in the portion away from the gypsum plate, the bubbles coalesce to become larger. As a result, the bubble size gradually increases with the distance from the gypsum plate. (3) Subsequently, the shaped foam is thoroughly dried and then fired to produce a cellular ceramic porous body having a cell size gradient.

Also in the case of the method of burning off inflammables to introduce pores, a ceramic porous body having a desired pore size distribution can be produced by first forming inflammable particles to provide a size gradient, and then impregnating a ceramic slurry into interstices between the inflammable particles. The average particle size of the ceramic particles in the slurry used is required to be smaller than the substantial minimum size of the inflammable particles. If this requirement is not satisfied, the slurry is hardly impregnated into the interstices between the inflammable particles. Then, the impregnated shaped body is heated in an oxidizing atmosphere to remove the inflammable particles. A resultant porous body has a gradually decreasing cell size distribution.

In the above description, the term "cell" means a hollow space in the porous body formed by the above foaming method or inflammable burning-off method, i.e., a space enclosed by struts made of sintered ceramics. In the foaming method, the cell corresponds to an internal space of a bubble. In the inflammable burning-off method, the cell corresponds to a portion occupied by an inflammable particle.

EXAMPLE 1

(1) Electrofused alumina particles having a maximum size of 20 µm, a Bayer alumina powder having an average particle size of 2 µm, and an alum-decomposed alumina powder having an average particle size of 0.5 µm were mixed to prepare an alumina powder having a size distribution of from 0.1 to 20 µm. A hundred parts of this powder, 30 parts of ion-exchanged water, and 0.5 part of poly (ammonium acrylate) were mixed in a pot mill for 24 hours to prepare a slurry.

(2) A two-part gypsum mold having a cavity with an inside diameter of 30 mm and a length of 100 mm, that had been preliminarily fabricated, was filled with ion-exchanged water having 5 parts of an alum-decomposed alumina powder dispersed therein. The slurry prepared in step (1) was injected gently into the central portion of the water in the gypsum mold from a dropping pipette that was a glass tube having an inside diameter of 5 µm. After a stopper was put in the gypsum mold, it was rotated at 1,000 rpm for 10 minutes. Subsequently, the stopper was removed to let the water gently flow out of the gypsum mold and, thereafter, the gypsum mold was left to stand in a room to dry the mold on the inner surface of which a thin layer of the alumina powder was deposited.

(3) Then, the gypsum mold was split into the two halves to remove a tubular alumina shaped body.

Figure 2:
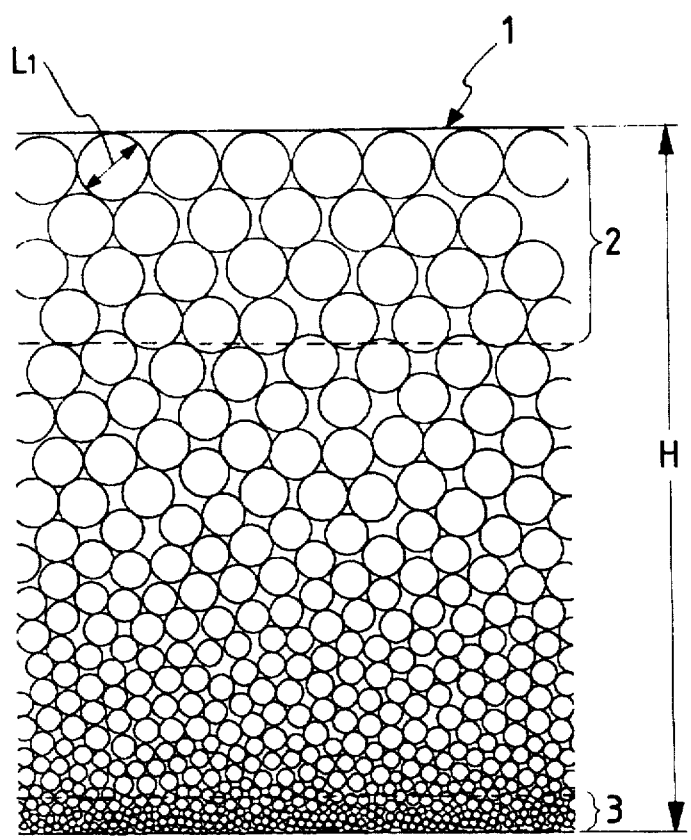
FIG. 2 is a sectional view taken along line I—I in FIG. 1.

As shown in FIGS. 1 and 2, the tubular alumina porous body 1 thus produced had a structure in which the particle size decreases in order from about 20 µm ($L_1$) of an outermost ceramic layer 2 to about 0.2 μm of an innermost ceramic layer 3.

As a matter of fact, microscopic observation of a cross-section of the sintered body showed that it had a wall thickness (H) of about 1 μmm, and that particles ranging from about 20 μm to about 0.2 μm in size had been charged to have a size gradient. It was also verified that the alum-decomposed alumina powder preliminarily dispersed in the ion-exchanged water in the gypsum mold contributed to the binding of larger particles. The alum-decomposed alumina particles had grown to have a minimum size of 0.2 μm.

As measurement with a mercury-filled porosimeter showed that fine pores in the tubular alumina porous body had a size gradient of from 0.1 μm to 10 μm. The ceramic tube could be used successfully as a filter with a small pressure loss while withstanding vibrations and impacts.

EXAMPLE 2

Carbon particles ranging from 20 μm to 5 μm in size were processed as in Example 1 to produce a tubular shaped body. In this example, the sintering was performed in a non-oxidizing atmosphere. The shaped body at this stage had a structure similar to that shown in FIG. 2. Then, 80 parts of an yttria-stabilized zirconia powder having an average particle size of 0.2 μm, 20 parts of ion-exchanged water, and 2 parts of poly(ammonium acrylate) were mixed in a pot mill for 24 hours to prepare a slurry. This slurry was impregnated into the above carbon shaped body, which was then left to stand in a room to dry it. Thereafter, the tubular shaped body was fired at 1,450° C. for 2 hours to burn off the carbon particles and to effect sintering.

Figure 3:
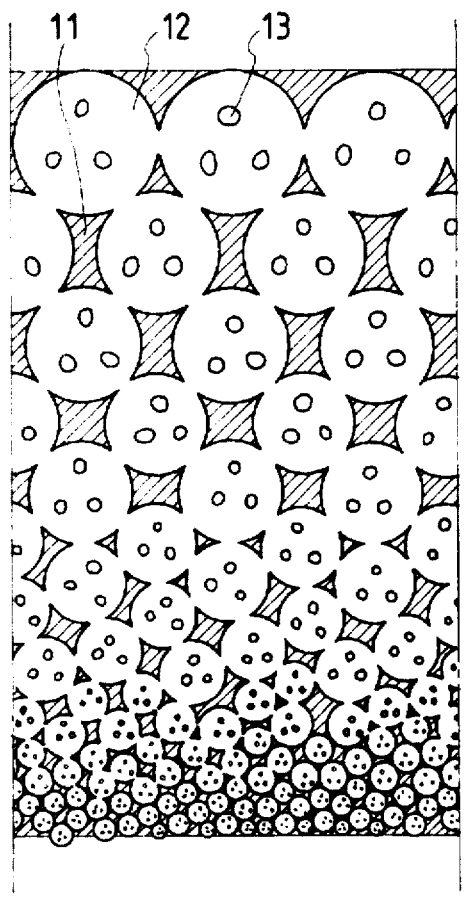
FIG. 3 is a sectional view taken along the thickness direction of a porous body according to example 2.

Thus, there was produced a porous body constituted of zirconia particles, i.e., struts 11 of sintered zirconia (see FIG. 3). The porous body had hollow spaces 12 formed by removal of the carbon particles and therefore having approximately the same sizes as the carbon particles. The adjacent hollow spaces 12 communicated with each other via a passage 13 that was formed at a portion where the adjacent carbon particles had been contacted with each other. The size of the hollow spaces 12 gradually decreased from one surface to the other surface. Although the hollow spaces 12 had substantially the same sizes as the carbon particles, they had somewhat shrunken by the sintering of zirconia (effected after the carbon particle removal) and had a size distribution ranging from 15 μm of the outermost layer to 3 μm of the innermost layer. The zirconia porous body as produced above can be used as a filter with a smaller pressure loss. Further, it can also be used as a support body when a filter is formed by laying on it, by a known method, a ceramic layer having a further smaller pore size.

EXAMPLE 3

Figure 4:
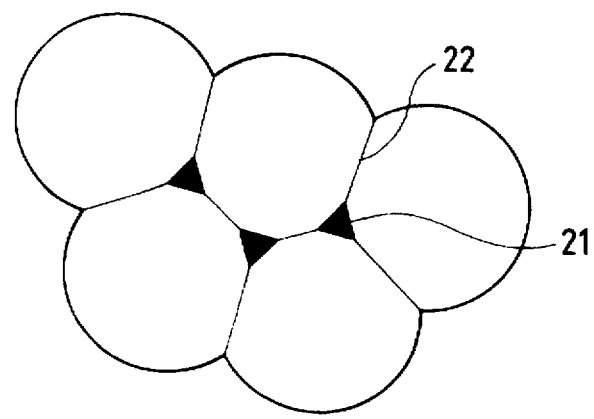
FIG. 4 is a schematic view showing bubbles in example 3.

A hundred parts of a silicon nitride powder having an average particle size of 0.8 μm, 5 parts of an alumina powder having an average particle size of 0.2 μm, 5 parts of an yttria powder having an average particle size of 0.5 μm, 30 parts of ion-exchanged water, and 3 parts of poly(ammonium acrylate) were mixed in a pot mill for 24 hours to prepare a slurry. Then, the slurry was mixed with 2 parts of methyl cellulose (binder) and 2 parts of ammonium stearate (foam stabilizer), and the mixture was foamed with an agitator. FIG. 4 schematically shows bubbles at this stage. An aggregate portion 21 is formed at a position where three or more bubbles are contacted with each other, and includes the liquids such as the binder and the ceramic particles such as those of silicon nitride. A thin film 11 is formed at a position where two bubbles are contacted with each other, and includes only the liquids, i.e., includes substantially no ceramic particles.

The resultant foam was poured over a dried gypsum board, and covered with a polyvinyl sheet to prevent excessive drying. While being placed in a room, water in the foam-like slurry was absorbed by the gypsum board, and its solidification proceeded from its underside. At the same time, bubbles in the foam coalesced gradually. The bubble coalescence proceeds faster when more moisture is included. In the portion of the foam close to the gypsum board, the moisture in the bubbles is absorbed by the gypsum board relatively faster and the bubble size is maintained small. On the other hand, in the portion away from the gypsum board, the bubbles coalesce to become larger. As a result, the bubble size gradually increases with the distance from the gypsum board. After being dried by leaving the foam to stand in a room for 24 hours, the resultant cellular shaped body was dewaxed by heating at 600° C. for 2 hours in an nitrogen gas, and then fired at 1,820° C. for 2 hours in a nitrogen gas. Thus, a cellular silicon nitride ceramic porous body was obtained.

FIG. 5 shows the porous body thus produced which is constituted of struts 31 made of sintered ceramics. The porous body has hollow spaces 32 corresponding to internal spaces o the bubbles. Each hollow space 32 communicates with other hollow spaces 32 via a passage 33. The strut 31 and the passage 33 correspond to the aggregate portion 21 and the film 22 in the bubble state, respectively.

Compared with the porous body of example 2, the porous body of example 3 had thinner struts and more passages. Therefore, the latter has more space in total and suitable for a heat insulator. Further, the porous body of example 3 can be used very effectively as a filter or a filter support because of its very small pressure loss.

A measurement on a cross-section of this ceramic porous body showed that the cells had a size gradient ranging from 100 μm to 300 mm in the direction of drying. When this ceramic porous body was used as a heat insulator in a nitrogen atmosphere, it proved to be about two times as effective as a conventional carbon fiber heat insulator.

As described above in detail, according to the invention, the ceramic porous body can be provided which can be easily varied in chemical composition and porous structure in accordance with its use, and which can be manufactured at low cost.

What is claimed is:

1. A method of producing a ceramic porous body with ceramic particles and comprising struts made of sintered ceramics and cells defined by hollow spaces enclosed by the struts, the struts formed into a single unitary body having a first surface and a second surface, wherein the cell size monotonically increases from the first surface to the second surface to produce a substantially continuous cell size distribution from the first surface to the second surface, said method comprising the steps of:

preparing a first ceramic slurry by suspending, in a first liquid, first ceramic particles having a size distribution and made of a material removable by oxidation;

introducing the first ceramic slurry into a second liquid;

applying centrifugal force to the first ceramic particles to move the particles in a direction of the centrifugal force to thereby form, onto a wall of a container of the second liquid, a shaped body of the first ceramic particles having a size distribution in which a ceramic particle size increases toward the movement direction;

drying the shaped body; and firing the dried shaped body in a non-oxidizing atmosphere;

preparing a second slurry including second ceramic particles having an average size smaller than a minimum size of the first ceramic particles;

impregnating the second slurry into the fired shaped body;

removing the first ceramic particles as a gas by oxidizing the first ceramic particles in an oxidizing atmosphere; and firing a porous body formed by the second ceramic particles after said step of remove.

2. A method of producing a ceramic porous body with ceramic particles and comprising struts made of sintered ceramics and cells defined by hollow spaces enclosed by the struts, the struts formed into a single unitary body having a first surface and a second surface, wherein the cell size monotonically increases from the first surface to the second surface to produce a substantially continuous cell size distribution from the first surface to the second surface, said method comprising the steps of:

preparing a first ceramic slurry by suspending, in a first liquid, first ceramic particles having a size distribution and made of a material removable by oxidation;

introducing the first ceramic slurry into a second liquid;

causing the first ceramic particles to move by gravity in a direction of the gravity to thereby form, onto a bottom surface of a container of the second liquid, a shaped body of the first ceramic particles having a size distribution in which a ceramic particle size increases toward the movement direction;

drying the shaped body; and firing the dried shaped body in a non-oxidizing atmosphere;

preparing a second slurry including second ceramic particles having an average size smaller than a minimum size of the first ceramic particles;

impregnating the second slurry into the fired shaped body;

removing the first ceramic particles as a gas by oxidizing the first ceramic particles in an oxidizing atmosphere; and firing a porous body formed by the second ceramic particles after said step of removing.

3. A method of producing a ceramic porous body with ceramic particles and comprising struts made of sintered ceramics and cells defined by hollow spaces enclosed by the struts, the struts forming a single unitary body having a first surface and a second surface, wherein the cell size monotonically increases from the first surface to the second surface to produce a substantially continuous cell size distribution from the first surface to the second surface, said method comprising the steps of:

preparing a slurry by suspending ceramic particles having a size distribution in a liquid;

agitating the slurry to foam;

drying the foamed slurry to form a dried shaped body while making the foamed slurry to be in contact substantially on one contact surface with a water absorbing member while preventing excessive drying on the surface away from the water absorbing member so that a bubble size increases from the contact surface to the surface away from the water absorbing member, the size of the ceramic particles being substantially smaller than a minimum bubble size; and firing the dried shaped body.

4. The method according to claim 3, wherein the water absorbing member is a gypsum plate.

* * * * *

UNITED STATES PATENT AND TRADEMARK OFFICE
CERTIFICATE OF CORRECTION

PATENT NO. : 5,762,841
DATED : June 9, 1998
INVENTOR(S) : SHIMAI et al.

It is certified that error appears in the above-identified patent and that said Letters Patent is hereby corrected as shown below:

Claim 1, column 7, line 13, "remove" should read --removing--.

Signed and Sealed this

Seventh Day of September, 1999

Attest:

Q. TODD DICKINSON

*Attesting Officer*     *Acting Commissioner of Patents and Trademarks*